JACQUES BAJER
INVENTOR.

Oct. 6, 1964 J. BAJER 3,151,877
SUSPENSION SYSTEM HAVING CONTROLLED WHEEL RECESSION
Filed Aug. 2, 1961 2 Sheets-Sheet 2

JACQUES BAJER
*INVENTOR.*

BY John R. Faulkner
Clifford L. Sadler

ATTORNEYS

United States Patent Office 3,151,877
Patented Oct. 6, 1964

3,151,877
SUSPENSION SYSTEM HAVING CONTROLLED
WHEEL RECESSION
Jacques Bajer, Dearborn, Mich., assignor to Ford Motor
Company, Dearborn, Mich., a corporation of Delaware
Filed Aug. 2, 1961, Ser. No. 128,874
7 Claims. (Cl. 280—124)

This invention relates to an automotive suspension system and more particularly to a suspension system that prevents ride harshness by permitting viscously damped fore and aft wheel movement.

In conventional automotive suspension systems, the body is resiliently supported to permit vertical wheel movement when road shocks and bumps are encountered. Springs and shock absorbers are interposed between the wheel and chassis structure to isolate these forces from the passengers. It is well known, however, that the force exerted by a bump or obstacle on a wheel in motion has both vertical and horizontal force components. Conventional suspension systems provide no way of isolating the horizontal force component from the passengers and an undesirable ride characteristic known as "harshness" results.

Suspension systems have been proposed in which ride harshness is eliminated by permitting the wheel to recede slightly when road shocks having horizontal force components are encountered. This type of suspension system may be generally termed a "compliance suspension."

Some mechanism must be employed in compliance suspensions to return the wheel to its normal position when the horizontal force is removed and, for the best results, there should be damping of the horizontal wheel movement. Conventionally these functions are accomplished by resilient bushings that are positioned between various suspension components and the chassis structure.

The resilient bushings, in addition to controlling wheel recession due to road shocks, must also counteract the horizontal forces encountered at the wheel during acceleration or deceleration. These forces are frequently quite severe and the resilient bushings cannot permit a satisfactory degree of compliance or recession under light loads and also absorb these additional loads. Further, the rubber is not sufficiently self-damping and wheel shudder or shake may result.

In view of the state of the art, it is an object of the present invention to provide a suspension system that permits a controlled degree of wheel recession to reduce ride harshness.

It is a further object of this invention to provide a compliance suspension system that eliminates wheel shudder and shake by having a high degree of horizontal damping at all loads without penalizing harshness reduction.

The suspension system of the present invention permits vertical and horizontal movement of the wheel with viscous damping means to control the movement in both directions.

In one embodiment of the invention, a suspension control arm is supported to permit horizontal wheel recession in addition to allowing vertical wheel movement. A drag strut is operably connected between a structural member of the vehicle and the control arm to maintain alignment during both horizontal recession and vertical deflection of the arm. A viscous damper is connected between the drag strut and the structural member to control the rate of wheel recession.

In another embodiment of the invention, the drag strut is extensible and has an integral viscous damper to control wheel recession. This embodiment additionally includes spring means which offer progressively increasing resistance as the wheel recession increases.

Further objects and advantages of this invention will become more obvious as this description proceeds particularly when considered in conjunction with the accompanying drawings, wherein.

Figure 1:
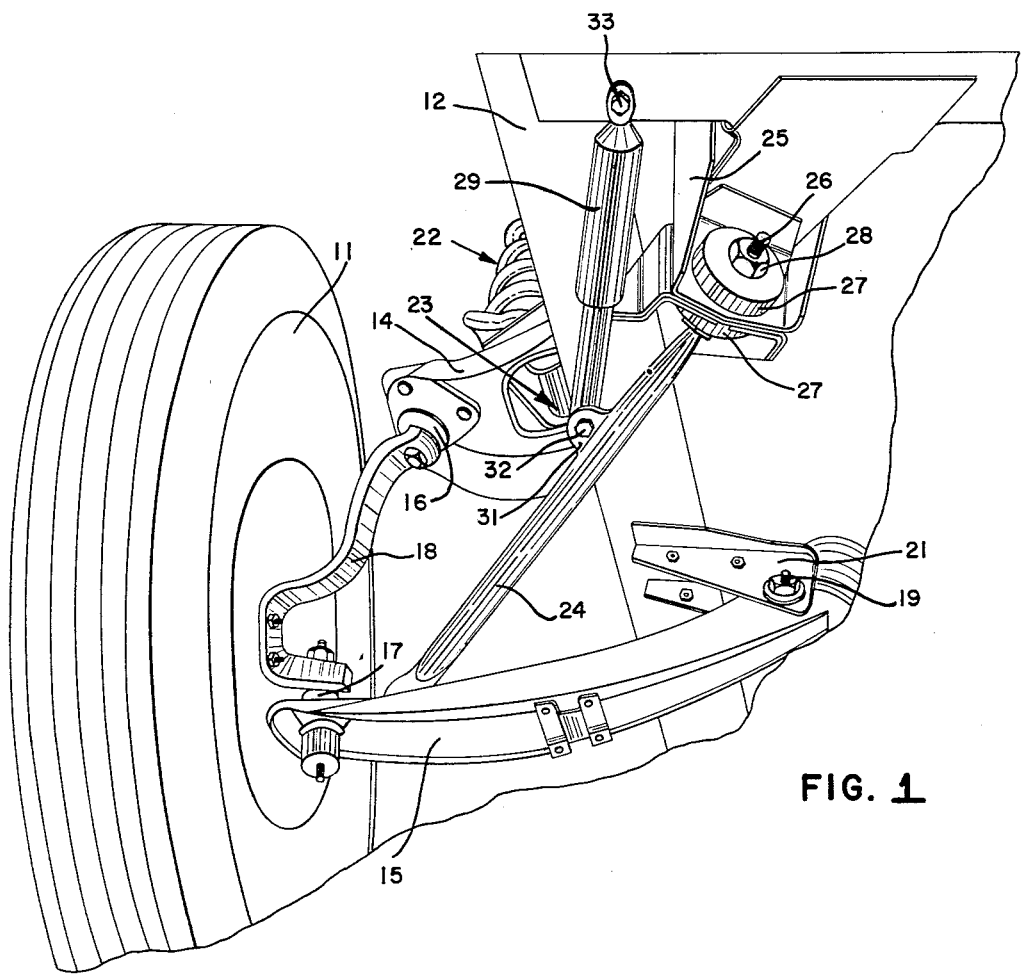
FIGURE 1 is a perspective view from beneath of the front portion of a motor vehicle incorporating an embodiment of the present invention.

Referring now in detail to the drawings and in particular to the embodiment shown in FIGURE 1, an automotive, independent front wheel suspension system is shown. In the illustrated construction, a wheel 11 is suspended for movement relative to a chassis member 12 by an upper control arm 14 and a lower control arm 15. At the outer ends of the control arms 14 and 15, upper and lower ball joint assemblies 16 and 17 respectively support the spindle 18. The wheel 11 is rotatable on the spindle 18.

The control arms 14 and 15 are pivoted at their inboard end on the chassis member 12 to allow movement of wheel 11 and spindle 18 assembly when road shocks are encountered. The pivotal connection for the upper control arm 14 is conventional and not shown. The lower control arm 15 is pivotally supported on a pivot pin 19 that is affixed to a frame bracket 21. The frame bracket 21 is welded or riveted to the chassis member 12. Vertical wheel shocks are isolated from the passengers by a spring and viscous shock absorber assembly generally indicated at 22. The spring and shock absorber 22 are connected between the upper arm 14 and the vehicular chassis in a known manner.

The lower control arm 15 is suspended on the pivot pin 19 in a manner to permit slight pivotal movement in a horizontal direction in addition to its normal vertical pivotal movement. For this purpose, a resilient bushing (not shown) is interposed between the arm 15 and the pivot pin 19. When the wheel 11 encounters road shocks, the horizontal component of the force will cause the lower control arm 15 to move slightly in a rearward direction by deformation of the rubber bushing. Thus the wheel 11 will be allowed to recede slightly.

It has been found that the resilient bushing positioned between the lower control arm 15 and its pivot pin 21 is not sufficiently rigid to completely control the horizontal movement of the lower control arm 15. A drag strut assembly, indicated generally at 23, is interposed between the lower control arm 15 and the chassis member 12 to control the rate of wheel recession and to return the lower control arm 15 to its normal position once the horizontal force is removed. The drag strut assembly 23, in addition, resists movement of the wheel 11 relative to chassis member 12 during severe acceleration or deceleration.

The drag strut assembly 23 includes a forged strut 24, the trailing end of which is rigidly secured to the lower control arm 15. Strut 24 extends forwardly and inwardly to a mounting bracket 25 welded to the chassis member 12. A threaded end 26 of the strut 24 passes through an aperture formed in the mounting bracket 25. Doughnut shaped resilient pucks 27 are positioned on each side of mounting bracket 25 about the end 26 of the strut 24. The tightness of a nut 28 threaded on the end 26 of strut 24 determines the preload on the resilient pucks 27. The pucks 27 will yield under loading to permit recession of wheel 11 and, in addition, yield to allow free vertical movement of wheel 11.

It has been found that the resilient pucks 27 are incapable of themselves of controlling the forces experienced during severe deceleration or acceleration or when the vehicle is traveling at high speeds down roads having irregular surfaces. To provide the magnitude and type of control required, a viscous damper or shock absorber 29 is provided. It is preferable to utilize a shock absorber of the type having an internal piston which separates a cylinder into two separate cavities. The cavities are filled with hydraulic fluid which may flow from one cavity to the other through suitable valving as the piston moves relative to the cylinder. This type of device is well known in the art. A lug 31 is formed on the strut 24 near its forward end to which one end of the shock absorber 29 is pivotally connected by a pin 32. The other end of shock absorber 29 is pivoted to chassis member 12 by a pin 33.

Horizontal movement of the wheel 11 relative to the chassis member 12 results in pivotal movement of the lower control arm 15. This movement is transformed into pivotal and axial movement of the strut 24 and is resisted and damped by the shock absorber 29. The shock absorber 29 thereby isolates horizontal forces exerted on the wheel 11 from the chassis member 12 and, accordingly, from the passengers. The resilient pucks 27 primarily maintain alignment and deaden high frequency oscillation. They serve no function in absorbing high magnitude dynamic loading of wheel 11.

Figure 2:
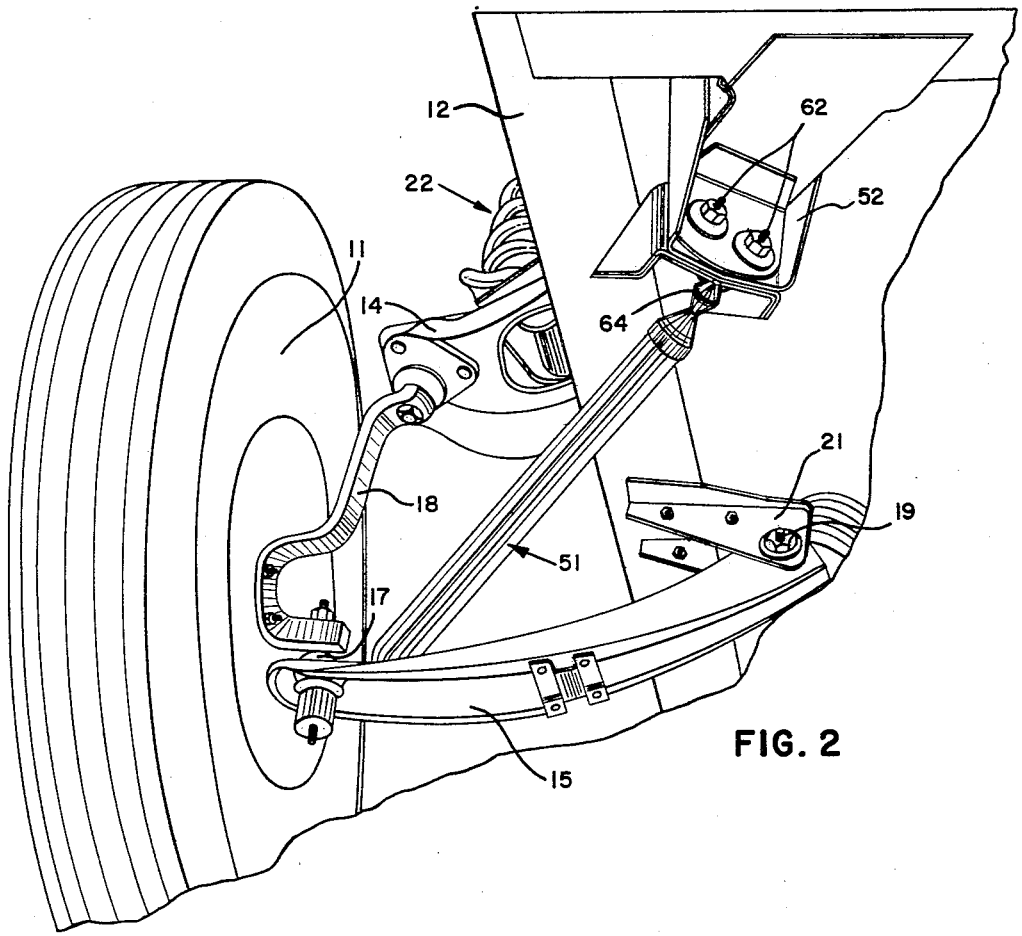
FIGURE 2 is a view similar to FIGURE 1 showing another embodiment.
Figure 3:
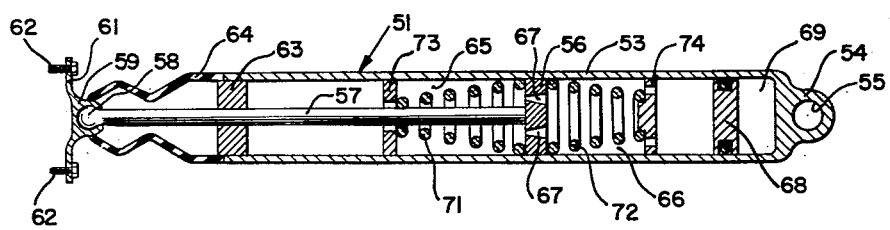
FIGURE 3 is a cross sectional view of the drag strut of the embodiment shown in FIGURE 2.

Another embodiment of the invention is shown in FIGURES 2 and 3. The embodiment shown in FIGURES 2 and 3 differs from the embodiment shown in FIGURE 1 only with respect to the drag strut assembly. In all other respects the suspension system is similar to that shown in FIGURE 1 and identical parts have been identified by the same reference numerals. Reference may be made to the description of the embodiment of FIGURE 1 for the details of the principal components.

The drag strut assembly of the embodiment of FIGURES 2 and 3 is indicated generally at 51 and includes an integral viscous damper. The drag strut 51 is connected between the lower control arm 15 and the mounting bracket 52 welded or riveted to chassis structural member 12.

The construction of the drag strut 51 may be best understood by reference to FIGURE 3 where the strut 51 is shown in cross sectional view. The strut 51 includes a cylindrical housing 53 having a mounting lug 54 formed therewith. The lug 54 is apertured at 55 to permit pivotal connection with the lower control arm 15. A piston 56 is received in the internal bore of the cylindrical housing 53 for reciprocation. A piston rod 57 is rigidly secured to the piston 56 at one end and is formed with a spherical ball 58 at the other end. The ball 58 is contained in a socket 59 formed in a bracket 61 which is, in turn, secured to the mounting bracket 52 as by the fasteners 62 (FIGURE 2.) The ball and socket connection permits pivotal movement of the piston rod 57 with respect to the mounting bracket 52.

The cylindrical housing 53 is sealed at one end by a plug 63 through which the piston rod 57 passes. A sealing boot 64 prevents the entry of dirt onto the exposed surface of the piston rod 57. The piston 56 divides cylindrical housing 53 into two chambers 65 and 66 that are filled with hydraulic fluid. During wheel recession, the piston 57 moves relative to the cylindrical housing 53 and the fluid may flow from one chamber to the other through the metering orifices 67 formed in the piston 56 to provide viscous damping. The pivotal connections of the ends of the strut 51 with the lower control arm 15 and the chassis member 12 allows unrestrained vertical movement of wheel 11.

A floating seal 68 is additionally contained in the cylindrical housing 53. The floating seal 68 establishes a chamber 69 which is charged with a high pressure gas, preferably nitrogen. The gas may expand or contract to compensate for the fluid displacement of the piston rod 57, and, further, to prevent cavitation during rapid movement of the piston 56.

In addition to furnishing viscous damping, the drag strut 51 includes centering springs 71 and 72. The springs 71 and 72 act on opposite sides of the piston 56 and are constrained between rings 73 and 74 which are rigidly secured to the cylindrical housing 53. The springs 71 and 72 offer additional resistance to recession of the wheel 11 and return it to its normal position when the horizontal forces are not present. It has been found desirable to provide a variable rate return spring mechanism for drag strut 51. The combination of springs 71 and 72 offer progressively increasing resistance to horizontal wheel deflections. This provides a greater degree of control than is possible with viscous damping alone.

It is to be understood that the constructions shown and described are exemplary only of specific forms of the invention. Various changes and modifications may be made without departing from the spirit of the invention. For example, chassis member 12 may be either a portion of the frame of a conventional frame type automobile, or a suitable structural member of a unitized vehicle. In addition, the invention is not limited to the type of independent suspension systems shown, but may be utilized with other suspension arrangements. Various other change and modifications may be made without departing from the spirit and scope of the invention as defined by the appended claims:

I claim:

1. In an automotive suspension system, a support member, a wheel, a suspension arm rotatably supporting said wheel, and means supporting said suspension arm on said support member to permit vertical movement of said wheel and recession of said wheel in a fore-and-aft direction relative to said support member, said supporting means including a viscous damping means controlling the vertical and fore-and-aft recessive movement of said wheel, said damping means including a resilient means that offers a progressively increasing rate of resistance to fore-and-aft recessive movement of said wheel.

2. In an automotive suspension system, a support member, a wheel, a suspension arm rotatably supporting said wheel, means supporting said suspension arm on said support member to permit vertical and fore-and-aft recessive movement of said wheel relative to said support member, a viscously damped drag strut operably connected between said arm and said support member to control the recessive movement of said wheel, said drag strut also having integral variable rate spring means to provide a progressively increasing rate of resistance to fore-and-aft recession of said wheel.

3. In an automotive suspension system, a support member, a wheel, a suspension arm rotatably supporting said wheel, means supporting said suspension arm on said support member to permit vertical and fore-and-aft recessive movement of said wheel relative to said support member, and a drag strut having integral viscous damping means operably connected between said arm and said support member effective to control wheel recession said integral viscous damping means including variable rate spring means providing an increasing rate of resistance to fore-and-aft recession of said wheel.

4. In an automotive suspension system, a support member, a wheel, a suspension arm rotatably supporting said wheel, means supporting said suspension arm on said support member to permit vertical and fore-and-aft recessive movement of said wheel relative to said support member, viscously damped drag strut means, said drag strut means comprising a piston element operably connected to said suspension arm and a cylinder operably connected to said support member, said piston being mounted for reciprocation within said cylinder, and fluid means within said cylinder operable to provide viscous damping for mostly low-rate fore-and-aft recessive movement of said wheel said viscously damped drag strut means further including variable rate spring means providing an increasing rate of resistance to mostly high-rate fore-and-aft recession of said wheel.

5. In an automotive suspension system, a support member, a wheel, a suspension arm rotatably supporting said wheel, means supporting said suspension arm on said support member to permit vertical and fore-and-aft recessive movement of said wheel relative to said support member, a viscously damped drag strut means, said drag strut means comprising a piston element operably connected to said suspension arm and a cylinder operably connected to said support member, said piston being mounted for reciprocation within said cylinder, fluid means within said cylinder operable to provide viscous damping for mostly low-rate fore-and-aft recessive movement of said wheel, and variable rate spring means interposed between said piston means and said cylinder means operable to provide an increasing rate of resistance to mostly high-rate fore-and-aft wheel recession.

6. In an automotive suspension system, a support member, a wheel, a suspension arm rotatably supporting said wheel, means supporting said suspension arm on said member to permit vertical and fore-and-aft recessive movement of said wheel relative to said support member, a viscously damped drag strut means, said drag strut means comprising a piston element operably connected to said suspension arm and a cylinder operably connected to said support member, said piston element being mounted for reciprocation within said cylinder, fluid means within said cylinder operable to provide viscous damping for fore-and-aft recessive movement of said wheel, a pair of spring means mounted in said cylinder with one of said spring means being disposed on one side of said piston element and the other of said spring means being disposed on the other side of said piston element, said pair of spring means effective to provide an increasing rate of resistance to movement of said piston element from its normal position in a fore-and-aft direction caused by the fore-and-aft recessive movement of said wheel, said pair of spring means returning said piston to its normal position upon the ceasing of the recessive movement of said wheel.

7. In an automotive suspension system, a support member, a wheel, a suspension arm rotatably supporting said wheel, means supporting said suspension arm on said support member to permit vertical and fore-and-aft recessive movement of said wheel relative to said support member, a viscously damped drag strut means, said drag strut means comprising a piston element operably connected to said suspension arm and a cylinder operably connected to said support member, said cylinder having a liquid portion and a gas portion, said piston element being mounted for reciprocating movement in the liquid portion of said cylinder, liquid contained in said liquid portion, said liquid operable to provide viscous damping for fore-and-aft recessive movement of said piston element and said wheel, gas contained in said gas portion, said liquid portion and said gas portion separated by a movable seal, a pair of variable springs mounted in the liquid portion of said cylinder with one of said pair of spring means being disposed on one side of said piston element and the other of said spring means being disposed on the other side of said piston element, each spring effective to provide an increasing rate of resistance to said piston element upon its movement from a normal position in a fore or aft direction caused by the fore-and-aft recession of said wheel, said gas acting on said seal to move the latter within the cylinder so as to compensate for liquid displacement caused by the movement of said piston element.

References Cited in the file of this patent

UNITED STATES PATENTS

| | | |
|---|---|---|
| 1,319,967 | Ralls | Oct. 28, 1919 |
| 1,864,134 | Harris | June 21, 1932 |

FOREIGN PATENTS

| | | |
|---|---|---|
| 153,013 | Great Britain | Oct. 26, 1920 |
| 700,840 | Great Britain | Dec. 9, 1953 |
| 1,139,353 | France | Feb. 11, 1957 |

OTHER REFERENCES

"Spring Design and Application," N.P. Chironis, McGraw-Hill, 1961 pp. 100, 229, 237, 238.